(No Model.) 4 Sheets—Sheet 1.

D. W. BOWMAN.
WASHING MACHINE.

No. 425,563. Patented Apr. 15, 1890.

WITNESSES.
Carroll J. Webster.
Anna J. Lehaney.

INVENTOR.
Daniel W. Bowman
By William Webster
Atty

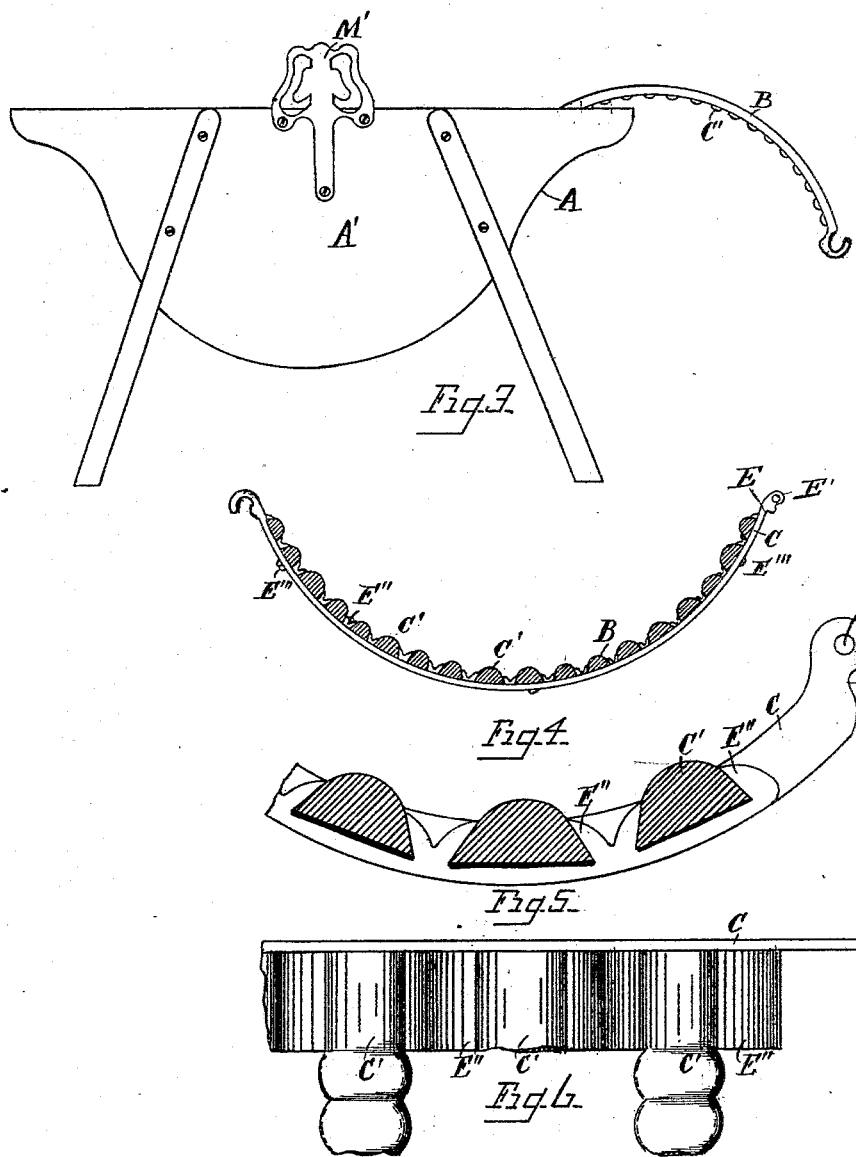

(No Model.) 4 Sheets—Sheet 3.

D. W. BOWMAN.
WASHING MACHINE.

No. 425,563. Patented Apr. 15, 1890.

WITNESSES
Carroll J. Webster
Anna J. Lehaney

INVENTOR
Daniel W. Bowman
By William Webster
Atty (No Model.) 4 Sheets—Sheet 4.
D. W. BOWMAN.
WASHING MACHINE.

No. 425,563. Patented Apr. 15, 1890.

Witnesses  
Albert Leidew  
Geo. Frock

Inventor  
Daniel Bowman  
By his Attorney  
Wm Webster

UNITED STATES PATENT OFFICE.

DANIEL W. BOWMAN, OF TOLEDO, OHIO.

WASHING-MACHINE.

SPECIFICATION forming part of Letters Patent No. 425,563, dated April 15, 1890.

Application filed January 14, 1889. Serial No. 296,298. (No model.)

*To all whom it may concern:*

Be it known that I, DANIEL W. BOWMAN, a citizen of the United States, residing at Toledo, in the county of Lucas and State of Ohio, have invented certain new and useful Improvements in Washing-Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to washing-machines in which an oscillating convex corrugated rubber head coacts with a concave corrugated fixed rubber portion.

The object of my invention is to provide a metallic fastening for each of the transverse bars forming the corrugated coacting rubbers, whereby the bars may be firmly held in place irrespective of the variation in size of the ends of the bars, and any variation in size caused by shrinkage may be compensated for.

A further object is to provide an interchangeable and reversible boxing for the axis of the rubber head to compensate for unevenness in wear of the same.

The invention consists in the parts and combination of parts hereinafter described, and pointed out in the claims.

Figure 1:
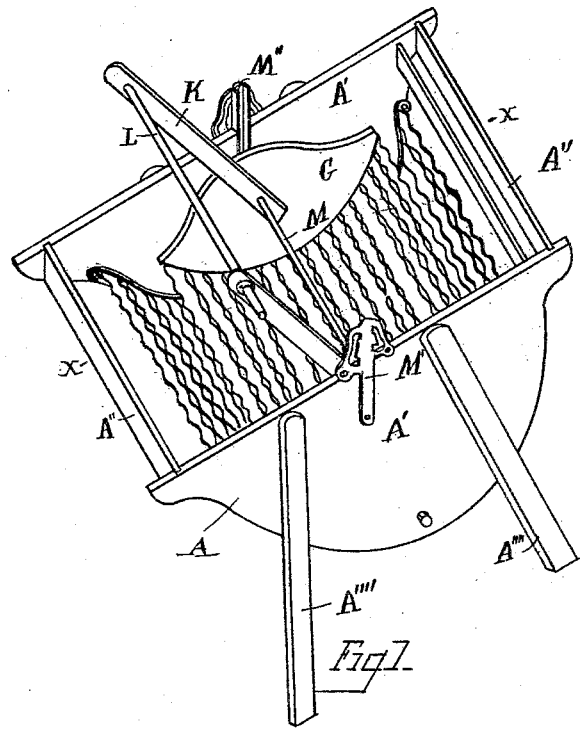
Figure 2:
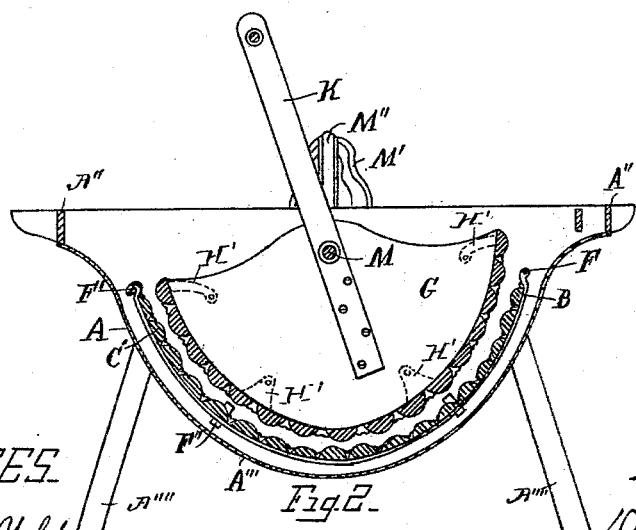
Figure 7:
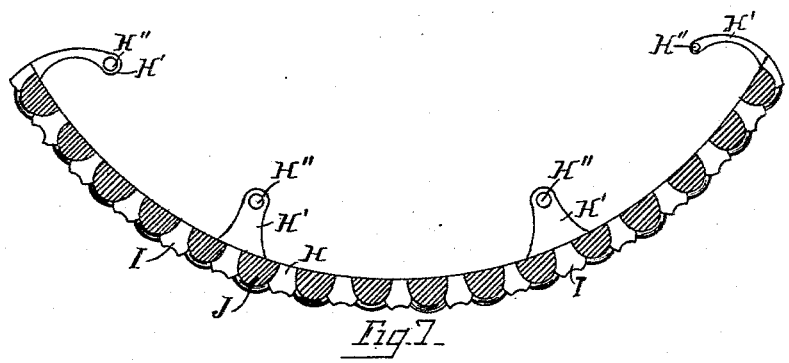
Figure 8:
Figure 9:
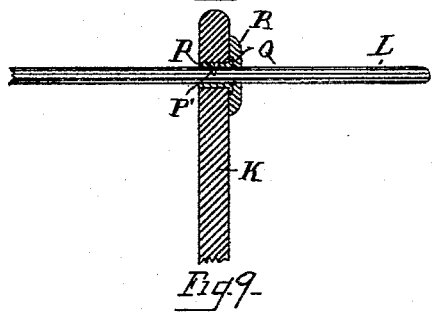
Figure 10:
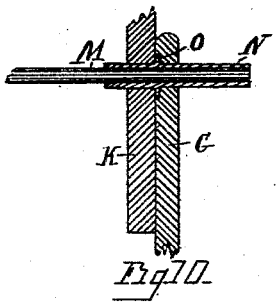
Figure 11:
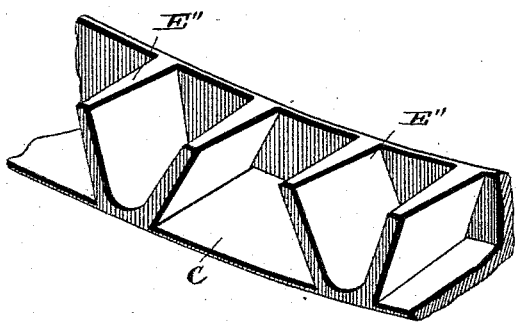
Figure 12:
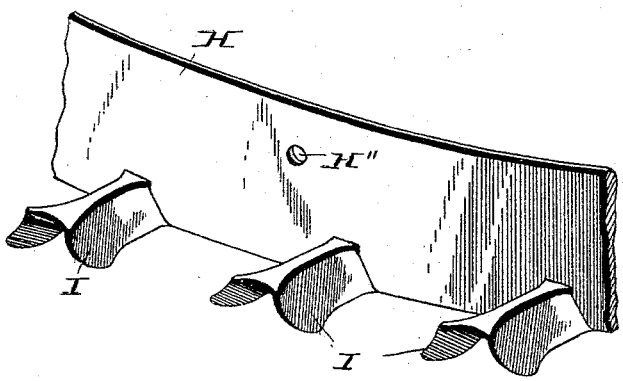

In the drawings, Figure 1 is a perspective view of my complete washing-machine. Fig. 2 is a longitudinal vertical section on lines $x$ $x$, Fig. 1. Fig. 3 is a side view showing the lower rubber moved in the arc of a circle to throw the same out of the suds-receptacle. Fig. 4 is a detail view of one of the metallic hangers of the lower rubber with the cross-bars secured in place. Fig. 5 is a longitudinal section of the hanger and bars, and Fig. 6 a plan view of the same on an enlarged scale. Fig. 7 is a detail view of the metallic fastener for the transverse bars of the rubber head, showing in section the bars secured in place. Fig. 8 is a plan view of a section of the metallic fastener of the rubber head. Fig. 9 is a view showing one of the side bars and boxing in longitudinal vertical section with the handle secured therein. Fig. 10 is a like view of the lower portion of the side bar secured to the rubber head with the axis journaled within interchangeable flanged boxes, which allow a movement of the rubber head upon the axis or box, respectively. Fig. 11 is a perspective view of a section of one of the hangers of the lower rubber, and Fig. 12 is a similar view of a section of one of the hangers of the upper rubber.

A designates the suds-receptacle, formed of side boards A', cross-bars A'', and a metal bottom A''' properly secured thereto, the whole supported upon legs A''''.

B designates the lower rubber, formed of interchangeable metal suspension side bars C and transverse corrugated bars C'. Each side bar C is formed with hook-shaped ends E, having perforations E' for the reception of pivot-bolts and with inwardly-projecting lugs E'', between which the transverse corrugated bars C' are held.

The two suspension-bars C are held from spreading laterally (and thereby allowing the corrugated bars to drop out) by means of screws E''', preferably three, which are screwed through perforations formed in the suspension-bars and pass into the corrugated wooden bars of the rubber. The two suspension-bars are pivotally attached at one side of the suds-receptacle by means of bolts or screws F, passed through perforations E' upon one end of each of said bars, and are suspended at the opposite ends by means of the hooks formed thereon engaging with like bolts or screws F', and are further supported by angle-irons F'', secured to the sides of the suds-receptacle and bearing beneath the suspension-bars intermediate their lengths.

The rubber head is formed of two oppositely-arranged head-pieces G, preferably formed of wood, and having a semicircular lower edge corresponding in contour to the circle of the concave lower rubber. Upon the side of each head-piece and extending below the same are secured semicircular metallic bars H, formed with angled hangers H', extending parallel with the outer sides of the head-pieces, and perforated at H'' for the reception of screws by which to secure the bars to the head-pieces. Each bar H is formed with integral lugs I, adapted to be spread at their inner ends to inclose a portion of the circumference of the semicircular ends of corrugated transverse bars J, corresponding in shape to the bars C' of the lower rubber.

K designates side arms attached to the head-pieces G and extending in a vertically-inclined direction therefrom, the arms being connected by a transverse handle-bar L, extending from one arm to the other, as shown in Fig. 1.

The rubber head is pivotally suspended within the suds-receptacle by means of a rod M, extending from end to end of the machine and journaled in metal bearings M', secured to the outer sides of the side boards A', and provided with a channel M'', extending within the suds-receptacle.

It being material to the effective operation of the device that all the movable parts shall be relieved of friction as much as possible, I have devised especial bearings for the axis of the rubber head as well as the handle-bar. The bearing for the axis of the rubber head consists of a thimble N, having an annular collar O formed thereon at a distance from the outer end, corresponding to one-half the entire length of the thimble and the thickness of the head-pieces G, whereby the bearing is made interchangeable to allow the same to be reversed to use either end as a bearing, as will be readily understood by reference to Fig. 10, wherein it will be seen that placing the collar O outside of the head-pieces will effect a reversal of the bearings, it being understood that the outer end of the bearing rests in the channel M''. The bearing for the handle-bar is formed with the object of allowing the handle to effect a rotary reciprocating motion to the rubber head without the necessity of the handle turning in the hands of the operator.

P designates a metal annulus serving as a bearing for the handle-bar L, being secured to the same by a screw P', either centrally of the length thereof or at one side. The bearing is formed with an annular collar Q upon one end, which abuts against the outer side of arm K, and is secured in place by a cap-plate R, fitting over the collar Q and secured to the arm, as shown in Fig. 9, and by which arrangement the bar may be held from turning in the hand when the arms are being moved in the arc of a circle, the wear being also largely transferred to the collar and cap-plate.

In operation, the corrugated bars C' being secured in place by being urged between lugs E'', and if not held with sufficient friction the points of said lugs being bent to more closely embrace the same, the lower rubber being pivotally secured in place by bolts or screws passed through perforations E' and into the ends of the suds-receptacle, the lower rubber is moved in the arc of a circle to rest within the suds-receptacle, the free ends of the suspension-arms resting upon the studs F' upon the opposite side, the intermediate portions resting upon angle-irons F''. The rubber head is now placed in position, with bearings N resting in channels M'', and the apparatus is ready for operation. In securing the corrugated cross-bars J in the metal bar H the ends, either reduced or of a normal size, are placed between lugs I, and the outer edges of the same are closed upon the sides of the end portions of the bars, thereby firmly holding the same in place.

It will be seen by the formation of the suspension-bars C that they are interchangeable. It will be further observed that by reason of the lower rubber being suspended some distance from the metallic bottom A''' of the suds-receptacle there is no wear thereupon, and also that the pressure upon the lower transverse bars will cause the suds to pass between the same, thereby facilitating the operation of washing.

By reason of the facility with which the lower rubber can be moved out of the suds-receptacle the cleansing of the same is easily accomplished and the rubber quickly dried, thereby preventing decay of the wooden transverse bars.

What I claim is—

1. In a washing-machine, the combination, with the curved metal suspension-bars formed with a laterally-projecting flange upon the inner lower edge of the same, and lugs formed integral with the said bars and flanges, thereby forming a series of recesses opening inwardly, of the transverse rubbing-bars having their ends inserted in the said recesses and secured therein by closing the lugs over the same, substantially as shown and described.

2. In a washing-machine, the combination, with a concave slatted bottom, of a convex slatted rubber, the shaft upon which said rubber oscillates, and reversible interchangeable bearing-tubes in which the axis turns, substantially as shown and described.

3. In a washing-machine, the combination, with a suds-receptacle, of a concave rubber pivoted at one end of the same, said rubber consisting of the curved metal side bars provided with a series of lugs, and the transverse corrugated rubbing-bars secured between the said lugs, the sides of the lugs being bent over the ends of the bars, the bolts F', with which the free hooked ends of the hangers engage, the angle-bar F'', upon which the concave rubber rests, and a convex rubber pivoted in the suds-receptacle adapted to reciprocate over the concave rubber, as and for the purpose set forth.

In testimony that I claim the foregoing as my own I hereby affix my signature in presence of two witnesses.

DANIEL W. BOWMAN.

Witnesses:
 WILLIAM WEBSTER,
 CARROLL J. WEBSTER.